United States Patent
Jury

(10) Patent No.: US 6,805,889 B1
(45) Date of Patent: Oct. 19, 2004

(54) CANDY HAVING A SYRUP COMPOSITION DISPERSED WITH CHOCOLATE

(75) Inventor: Mark Jury, Thirsk (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 08/752,917

(22) Filed: Nov. 20, 1996

(30) Foreign Application Priority Data

Nov. 20, 1995 (GB) .............................................. 9523669
Aug. 23, 1996 (GB) .............................................. 9617651

(51) Int. Cl.$^7$ ................................................ A23G 3/00
(52) U.S. Cl. ...................... 426/103; 426/249; 426/281; 426/660; 426/516; 426/517
(58) Field of Search ................................ 426/631, 103, 426/516, 517, 515, 660, 249, 93, 281; 425/131.1, 133.1, 376.1, 382.3

(56) References Cited

U.S. PATENT DOCUMENTS

| | | | | |
|---|---|---|---|---|
| 1,649,307 A | * | 11/1927 | Hunter | 426/516 |
| 1,865,097 A | * | 6/1932 | Gilham | 426/249 |
| 2,334,052 A | * | 11/1943 | Wedin | 426/249 |
| 2,700,943 A | * | 2/1955 | Kretchmer | 426/517 |
| 2,874,649 A | * | 2/1959 | Pelletiar | 426/249 |
| 3,307,503 A | * | 3/1967 | Elmer, Jr. et al. | 426/516 |
| 3,545,981 A | * | 12/1970 | Klein et al. | 426/249 |
| 3,971,853 A | * | 7/1976 | Crowder | 426/249 |
| 4,010,284 A | * | 3/1977 | Bellew | 426/516 |
| 4,357,359 A | * | 11/1982 | Cloud et al. | 426/103 |
| 4,382,968 A | * | 5/1983 | Akutagawa | 426/249 |
| 4,399,154 A | * | 8/1983 | Puglia et al. | 426/5 |
| 4,524,081 A | * | 6/1985 | Bansal | 426/516 |
| 4,563,358 A | * | 1/1986 | Mercer et al. | 426/516 |
| 4,643,904 A | * | 2/1987 | Brewer et al. | 426/516 |
| 4,847,090 A | * | 7/1989 | Della Posta et al. | 424/440 |
| 4,873,104 A | * | 10/1989 | Butcher et al. | 426/249 |
| 4,925,380 A | * | 5/1990 | Meisner | 426/249 |
| 5,013,575 A | * | 5/1991 | Stadler et al. | 426/516 |
| 5,017,385 A | * | 5/1991 | Wienecke | 426/5 |
| 5,147,669 A | * | 9/1992 | Crothers | 426/101 |
| 5,356,648 A | * | 10/1994 | Kortschot | 426/249 |
| 5,439,695 A | * | 8/1995 | Mackey | 426/516 |
| 5,492,706 A | * | 2/1996 | Cockings et al. | 426/516 |
| 5,549,917 A | * | 8/1996 | Cherukuri et al. | 426/516 |
| 5,603,975 A | * | 2/1997 | Fontana | 426/516 |
| 5,626,892 A | * | 5/1997 | Kehoe et al. | 426/3 |

\* cited by examiner

*Primary Examiner*—Nina Bhat
(74) *Attorney, Agent, or Firm*—Winston & Strawn LLP

(57) ABSTRACT

A confectionery product comprising chocolate or a fat-containing confectionery material together with a chewy sweet component having a base of a continuous syrup comprising a solution of sugars, sugar substitutes and/or glucose syrups in water characterised in that the confectionery product comprises a chocolate matrix having veins or strands of chewy sweet dispersed throughout.

16 Claims, No Drawings

CANDY HAVING A SYRUP COMPOSITION DISPERSED WITH CHOCOLATE

BACKGROUND OF THE INVENTION

The present invention relates to a confectionery product comprising chocolate together with a chewy sweet component having a base of a continuous syrup comprising a solution of sugars, sugar substitutes and/or glucose syrups in water.

In European Patent Application Publication No. 0 603 467, the contents of which are hereby incorporated into the present specification, a method is described for the cold extrusion of chocolate or a fat-containing confectionery material in a solid or semi-solid non-pourable form whereby the extruded product has a temporary flexibility or plasticity enabling it to be physically manipulated or plastically deformed, e.g. it can be cut, bent, twisted or injected into a mould.

As is well known, chewy sweets have a base of a continuous syrup comprising a solution of sugars, sugar substitutes and/or glucose syrups in water together with other ingredients dissolved or dispersed within to modify the texture, flavour and appearance, e.g. milk, fats such as milk fats, flavours, colouring agents, proteins, hydrocolloids such as starch or gelatin, gums such as gum arabic, emulsifiers, sugar crystals, etc., and which may be caramelised in the case of toffee and caramel. Toffees and caramels normally contain as basic ingredients, sugar, glucose syrup, milk protein, fat, salt and water. Formulations of toffees and caramels are described in the book "Sugar Confectionery Manufacture" edited by E. B. Jackson, Chapter 9—"Caramel Toffee and Fudge" by D. Stansell, published by Blackie, 1990.

Mention here is made that the name caramel is also used for products made by the breakdown of carbohydrates by heat or by heat and alkali treatment, which products are predominantly used as colouring materials, and it should be understood that caramel in this sense is not used in the present invention.

Chewy sweets such as toffees and caramels have a characteristic flavour, texture and mouthfeel which is distinct from chocolate. Products containing both chocolate and either toffee or caramel are known but in such products, the toffee and caramel are distributed separately within the chocolate. For example, one product comprising a bar of chocolate having dispersed therein pieces of caramel is prepared by mixing liquid chocolate with pieces of caramel. Another product comprising toffee surrounded by a chocolate coating is prepared by incorporating liquid toffee into a shell moulded chocolate.

It is possible to produce a product comprising a more intimate mixture of toffee and chocolate by mixing liquid toffee and liquid chocolate. The temperature of the ingredients is typically 30° C. or higher provided that both ingredients are in liquid state. The liquid state leads to intimate mixing and the production of a homogeneous product.

SUMMARY OF THE INVENTION

It surprisingly has been found that use of a cold extrusion process similar to that described in the above-mentioned application, European Application Publication No. 0 603 467, enables production of a product which is an intimate mixture of chocolate together with a chewy sweet component but which is not homogeneous. This product comprises a chocolate matrix having veins or strands of chewy sweet dispersed therein and has a unique texture which combines the smooth mouthfeel and bite of the chocolate with the flavour and chewy texture of the chewy sweet. Accordingly, the present invention provides a candy product (referred to the reminder of this specification as a "confectionery product" comprising chocolate or a fat-containing material together with a chewy sweet component (referred to in the claims below as a "confectionary composition") having a base of a continuous syrup comprising a solution of sugars, sugar substitutes and/or glucose syrups in water characterised in that the confectionery product comprises a chocolate matrix having veins or strands of chewy sweet dispersed throughout and a method for preparing the product comprises extruding a mixture of the chocolate or fat-containing confectionery material together with the chewy sweet component at a temperature at which both ingredients, throughout the extrusion process, are in a solid or semi-solid non-pourable or non-flowable form from a point of being fed into the extruder until emerging from a die.

Typically, the veins or strands of chewy sweet are dispersed throughout the chocolate matrix in a roughly longitudinal direction, as a result of the extrusion process.

DETAILED DESCRIPTION OF THE INVENTION

In accordance with the present invention, the confectionery product may contain for example from 5% to 75%, preferably from 10 to 50% and especially from 15 to 40% by weight of the chewy sweet based on the total weight of the confectionery product.

The chewy sweet may be, for instance, a toffee or a caramel and the formulations can be varied according to requirements, e.g. to give different hardness and flow properties.

The sugar component of toffee and caramel is preferably sucrose; the usual glucose syrup is 42-DE acid converted glucose; the milk protein is usually introduced as sweetened condensed milk; and the fats are usually butter and/or vegetable fats such as hardened palm kernel oil (HPKO), or fat blends containing partially hydrogenated palm, soya, groundnut, rapeseed and other oils. If desired, emulsifiers such as soya lecithin or glyceryl monostearate may be present.

The chocolate material may be dark, milk or white chocolate. Fat-containing confectionery materials may include sugar, milk-derived components, and fat and solids from vegetable or cocoa sources in differing proportions and have a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC sold by Nestle comprising non-cocoa butter fats, sugar and milk. Since the fat-containing confectionery material contains less than 10% water, flour confectionery products such as cakes and pastries are excluded.

The confectionery products of the present invention have a unique chewy texture with a smooth mouthfeel. The usual tendency of chewy sweets to stick to the teeth is less apparent in this product.

As referred to above, described in European Patent Application 0 603 467 is a process for plastically extruding a fat-containing confectionery material which comprises feeding the fat-containing confectionery material into an extruder and applying pressure to the fat-containing confectionery material in a substantially solid or semi-solid non-pourable form upstream of a flow constriction at a temperature at which the fat-containing confectionery material is extruded substantially isothermally and remains in a solid or semi-solid non-pourable form to produce an axially homogeneous extruded product having a cross-section which is of substantially a same profile as the die exit of the extruder.

As set forth in that application, "substantially isothermally" means that the temperature of the fat-containing confectionery material remains substantially unchanged under the conditions of the extrusion from the input to the outlet of the flow constriction if there is no external heating or cooling means. The use of external heating or cooling means, however, is not excluded as long as the material being extruded remains in a substantially solid or semi-solid non-pourable state throughout the extrusion from the input to the outlet of the flow constriction. In other words, the temperature of the fat-containing confectionery material is not caused to increase substantially by the extrusion process itself. The physical state of the fat-containing confectionery material is such that its general deformation behavior during extrusion is of a plastic nature rather than that of a viscous fluid. Additionally, an important feature of the extrusion process is that for a given die configuration and material composition, the extrusion rate is weakly dependent upon the extrusion pressure.

The flow constriction may be any narrowing of the cross-sectional area of a conduit but it is usually a die, and extrusion can be generated by a differential pressure across the flow constriction. This may be established, for example, by a ram extruder conveniently operating at a controlled rate or pressure. The extruder may be, for example, a DAVENPORT extruder, a constant pressure extruder, a single-screw extruder, a twin-screw extruder or CONFORM machine.

The extrusion process necessarily includes a form of deformation between the input and outlet of the extrusion system. The convergence or contraction ratio into any extrusion orifice is preferably greater than 1.5 where the convergence or contraction ratio is defined as the ratio of the inlet area to the minimum cross-sectional area of the die for a simple cylindrical extrusion geometry.

During extrusion, it is important that the fat-containing confectionery material does not become pourable and the extrusion temperature and pressure should be maintained below a level where this may happen. Thus, although, the fat-containing confectionery material may be fed into the barrel of the extruder in the liquid or paste form, it preferably is fed into the barrel in the solid or semi-solid form, and the material is, however, extruded in a solid or semi-solid non-pourable form. The fat-containing confectionery material may be in a granular or continuous form. When in granular form, the granular nature of the fat-containing confectionery material appears to be lost during extrusion to give an essentially uniform material.

In carrying out the extrusion method to produce the product, the chewy sweet component may be fed into the extruder either together with the chocolate or fat-containing confectionery material or it may be introduced into the extruder downstream of the point where the chocolate or fat-containing confectionery material is introduce but upstream of the die. The temperature of both ingredients during the extrusion may conveniently be from −5° C. to 34° C., preferably from 10° to 30° C., more preferably from 15° C. to 25° C. and especially from 18° to 22° C. Lower temperatures are preferred for lower melting materials, such as a high butterfat milk chocolate.

The extruder may be a ram extruder, a single-screw extruder or a twin screw extruder. The twin screw extruder may be either one using counter-rotating screws or one using co-rotating screws.

The pressure of the extrusion may be from 1 to 1000 bars, preferably from 5 to 500 bars and especially from 10 to 250 bars.

During the extrusion, the chewy sweet ingredient is extruded and flows with the chocolate or fat-containing material to give a product having the unique texture hereinbefore described. The extrusion process imparts a plastic deformation, and the viscosity difference between the two ingredients (chocolate is more viscous than chewy sweets) enables some mixing to obtain an extruded product having a matrix of chocolate with veins or strands of chewy sweet dispersed through the matrix usually in a roughly longitudinal direction in that the chewy sweet ingredient elongates, or extends, in a direction to form a vein or strand. The surface finish of the product may have a marbled appearance. The degree of mixing may be varied by adjusting the extruding conditions and the extruder type. For example, it is possible to produce a few large strands of chewy sweet within the chocolate matrix or, if desired, it is possible to produce a very fine dispersion of veins or strands of chewy sweet within the chocolate matrix to give the appearance of a homogeneous product.

The extruded confectionery product has a temporary flexibility which may last up to 4 hours, e.g. from 30 seconds to 2 hours, more usually from 1 minute to 1 hour and preferably from 5 minutes to 45 minutes. During this period of temporary flexibility, the extruded confectionery product may be injection moulded as described in EP-A-0603467 or GB-A-9504686.8, cut, formed into a bag or pouch, for instance, by a method as described in GB-A-5471, or manipulated as described in GB-A-9522162.8 or GB-A-9522263.4.

If desired, other food ingredients may be incorporated into the extruded confectionery product, e.g. nuts, dried fruit pieces, biscuits, potato crisps, sugar pieces or other particulate food ingredients, or any mixture of two or more thereof. The size of the pieces and proportion of these other ingredients may vary according to the requirements such as the organoleptic characteristics required. For instance, these other ingredients may be incorporated in amounts of 1 to 75%, preferably from 2 to 50% and more usually from 5 to 30% by weight based on the total weight of the confectionery product. These other ingredients may be added, for example, to one or both of the chocolate or fat-containing confectionery material and the chewy sweet component during their manufacture while still in the liquid state prior to cooling before extrusion or, more conveniently, they may be added into the extruder together with the pieces of the solid or semi-solid chocolate or fat-containing confectionery material. These other ingredients may then be extruded together with the mixture of the chocolate or fat-containing confectionery material and the chewy sweet component through the extruder.

The following Example further illustrates the present invention.

EXAMPLE 25 parts of toffee in particulate form having an average diameter of 3–5 mm and 75 parts of chocolate buttons are fed from a hopper at 23° C. into a FLORIN hydraulically driven ram extruder having a die opening of 5 mm cross-section. The ram is advanced at a pressure of 80 bars and non-pourable rods of a product comprising a mixture of chocolate and toffee having 5 mm diameter are extruded. The product comprises a chocolate matrix with strands of toffee running through in a roughly longitudinal direction, the surface of which has a marbled appearance. It has a temporary flexibility which lasts for about 45 minutes. It has a smooth mouthfeel and bite like chocolate with a toffee flavour and chewiness and does not readily stick to the teeth.

I claim:

1. A process for producing a confection product comprising:

providing an interspersed mixture of a particulate chocolate and a particulate confectionery composition comprising a syrup in an extruder that includes an extrusion die; and applying pressure to the mixture in the extruder to pass the mixture through the extrusion die at a temperature such that the mixture and extrudate are in a non-pourable state to plastically deform the mixture to obtain an extrudate that has veins of the confectionery composition interspersed within a matrix of the chocolate.

2. The process of claim 1, wherein the syrup is selected from the group consisting of a sucrose syrup and glucose syrup.

3. The process of claim 2, wherein the confectionery composition further comprises milk protein and a fat.

4. The process of claim 2, wherein the confectionery composition is selected from the group consisting of a toffee and a caramel.

5. The process of claim 1, wherein the confectionery composition further comprises milk protein and a fat.

6. The process of claim 1, wherein the confectionery composition is a toffee.

7. The process of claim 1, wherein the confectionery composition is a caramel.

8. The process of claim 1, wherein the confectionery composition is in an amount of from 10% to 50% by weight of the product.

9. The process of claim 1, wherein the confectionery composition is present in an amount of from 15% to 40% by weight of the product.

10. The process of claim 1, wherein the process further comprises feeding a particulate food ingredient selected from the group consisting of nuts, dried fruit pieces, biscuit pieces, potato crisp pieces, sugar pieces and mixtures thereof into the extruder so that the mixture extruded further comprises the food ingredient.

11. The process of claim 1, wherein the extruded mixture and the extrudate have a temperature of about between −5° C. to 34° C.

12. The process of claim 1, wherein the extruded mixture and the extrudate have a temperature of about between 10° C. to 30° C.

13. The process of claim 1, wherein the chocolate is selected from the group consisting of dark chocolate, milk chocolate, and white chocolate.

14. The process of claim 13, wherein the confectionery composition is selected from the group consisting of a toffee and a caramel.

15. A process for producing a confectionery product comprising:

feeding into an extruder first and second compositions in particulate form to obtain a mixture thereof in particulate form in the extruder, the first composition being selected from the group consisting of a chocolate substitute that comprises a cocoa butter replacement and of a chocolate analogue that comprises a cocoa butter replacement, and a second composition comprising a confectionery that comprises a syrup;

applying pressure to the mixture in the extruder to pass the mixture through the extruder to and through a common extruder die at a temperature such that the mixture and extrudate are in a non-pourable state to plastically deform the mixture to obtain an extrudate from the die, wherein the second composition forms veins interspersed within the first composition in the extrudate; and obtaining the extrudate from the die as the product.

16. The process of claim 15, wherein the second composition is selected from the group consisting of a toffee and a caramel.

* * * * *

UNITED STATES PATENT AND TRADEMARK OFFICE
CERTIFICATE OF CORRECTION

PATENT NO. : 6,805,889 B1
DATED : October 19, 2004
INVENTOR(S) : Jury

It is certified that error appears in the above-identified patent and that said Letters Patent is hereby corrected as shown below:

<u>Title page,</u>
Item [57], ABSTRACT, delete the entire text of the ABSTRACT and insert the following: -- A candy product of chocolate and of a syrup confectionery composition which are interspersed so that the syrup confectionery composition defines a plurality of veins dispersed in the product. Production of the product is effected by cold extrusion by applying pressure to a particulate mixture of the chocolate and syrup confectionery composition in an extruder, in that the mixture passed through the extruder and the extrudate from an extruder die are at a temperature so that the mixture and extrudate are in a non-pourable state, and the pressure is applied so that the chocolate and confectionery composition plastically deform so that the confectionery composition defines veins interspersed within the chocolate. --.

<u>Column 2,</u>
Lines 5-6, delete "(referred to the reminder" and insert -- (referred to in the remainder --.

<u>Column 4,</u>
Line 5, after "extruder or a" delete "twin screw" and insert -- twin-screw --.

<u>Column 5,</u>
Line 13, delete "confection" and insert -- confectionery --.

Signed and Sealed this

Fourteenth Day of December, 2004

JON W. DUDAS
*Director of the United States Patent and Trademark Office*